Oct. 23, 1934. M. LOUGHEAD 1,978,211
FLEXIBLE HOSE FOR FLUID PRESSURE SYSTEMS
Filed July 18, 1928
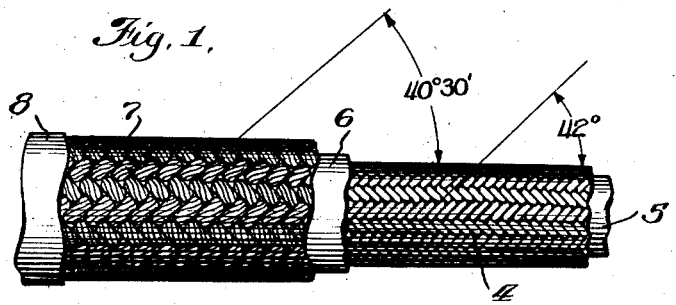
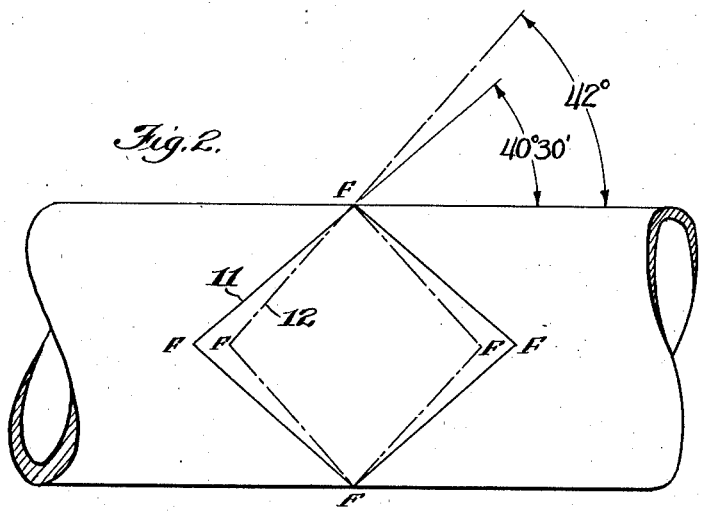
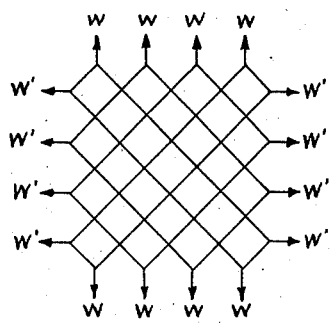
Inventor
Malcolm Loughead Patented Oct. 23, 1934

1,978,211

UNITED STATES PATENT OFFICE 1,978,211

FLEXIBLE HOSE FOR FLUID PRESSURE SYSTEMS

Malcolm Loughead, Detroit, Mich., assignor to Hydraulic Brake Company, Los Angeles, Calif., a corporation of California Application July 18, 1928, Serial No. 293,673

7 Claims. (Cl. 137—90)

This invention relates to a high pressure hose. It is important that a high pressure hose used for conveying non-compressible liquid in a fluid pressure operated system shall be substantially non-expansive under the pressures encountered in the operation of the system. Any expansion of the hose will result in an increase of the volume of fluid therein and thus detract from the amount of fluid which should be transferred to the means to be operated by the fluid pressure.

An object of the invention is to provide a flexible hose capable of withstanding high internal pressures.

A further object of the invention is to provide a hose which is substantially non-expansible under high internal pressures.

Other features and advantages of the invention will appear from the following description taken in conjunction with the accompanying drawing, in which Fig. 1 is a fragmentary side elevation of a portion of the hose embodying the invention, Fig. 2 is a diagrammatic illustration showing the effects of a variation in the angle of the strands of a braided hose, and Fig. 3 is a graph illustrating certain geometrical principles involved in the invention.

Referring to the drawing, a flexible hose according to the invention is shown having an internal tube 5 of a rubber composition or other suitable hose material, upon which is superposed a layer of braided material 4, the individual strands of which are disposed at an angle of 42 degrees with respect to the longitudinal axis of the hose. The layer 4 is covered by another layer 6 of a rubber composition upon which is superposed a further layer 7 of braided material. The individual strands of the layer of braided material 7 are disposed at an angle of 40° 30' with respect to the longitudinal axis of the hose, and the layer 7 is covered by a layer 8 of a rubber composition which forms the outer layer of the hose.

It has been found that the angle of the strands from which the layers 4 and 7 are braided, measured from the longitudinal axis of the hose, has an important bearing upon the behavior of the hose when a fluid under high pressure is contained therein.

A high pressure in a hose exerts a radial force upon the inner surface of the hose, causing a tendency for the hose to increase in diameter and expand circumferentially. The pressure at the same time exerts a longitudinal force upon the hose, causing a tendency for the hose to lengthen. The amount of radial or longitudinal expansion of the hose depends upon the relative magnitude of the radial and longitudinal forces and upon the angle of the strands of the braided layers of the hose.

Referring to Fig. 3, a portion of a braided layer of the hose is shown diagrammatically with longitudinal forces W' and circumferential forces W applied thereto. Since the sides of the meshes in a braided layer are all of equal length, the meshes would all form squares if the forces W' and the forces W were equal. It has been found by experiment, however, that the longitudinal forces W' in a hose are slightly greater than the circumferential forces W, so that the meshes will have a longer longitudinal than circumferential axis. If the angle of the strands of a braided layer is made of such a value that the parallelogram of forces is similar to the meshes, there will be no distortion of the hose when subjected to a fluid pressure. By making the angle of the strands exactly as determined by the parallelogram of forces, a somewhat unstable condition is obtained, since a slight variation in the relative longitudinal and circumferential forces will result in a change in the angle of the parallelogram. In order to stabilize this condition, two layers of braided material are used and one of the stranded layers is made at an angle slightly smaller than determined by the parallelogram of forces, and the other layer is made at an angle slightly greater than determined by the parallelogram of forces, with the result that there will be no appreciable tendency for the hose to expand either circumferentially or longitudinally when subjected to a high fluid pressure.

The lower layer of braided material 4, as stated above, has its strands disposed at an angle of 42 degrees from the longitudinal axis of the hose. There is a layer of resilient material 6 interposed between the layer 4 and the second layer of braided material 7 which has its strands disposed at an angle of 40° 30'. When the hose is subjected to a fluid pressure, the layer 4 will tend to expand first, and upon its expansion the layer 6 will be compressed and tend to expand the layer 7. Since the layer 4 must expand first and due to the resilient layer 6 therebetween, there will be a greater circumferential force exerted upon the layer 4 than is exerted upon the layer 7. The longitudinal forces upon the layers 4 and 7 will, however, be equal. On account of the fact that the circumferential forces on the layer 7 are smaller than on the layer 4, the angles of the strands of layer 7 are made at a smaller angle to the longitudinal axis of the hose than the strands of layer 4.

From a consideration of Fig. 2 of the drawing in which a full line mesh 11 is shown having its sides at an angle of 40° 30' with the longitudinal axis of the hose and a broken line mesh 12 is shown having its sides at an angle of 42°, it will be seen that for given longitudinal and circumferential forces F the mesh 12 would have less tendency to expand circumferentially than the mesh 11. In other words, the greater the angle of the strands of a braided layer the less would be the tendency of the hose to expand circumferentially. It is desirable to have the layer of least circumferential expansibility on the outside so as to afford a greater reenforcement to the inner layer. The fact that the layer whose strands have a greater angle has less circumferential expansibility would seem to indicate that the angle of the strands in the outer layer 7 should be larger than the angle of the strands of the inner layer in order to have the layer of least circumferential expansibility on the outside. However, due to the fact that the circumferential forces in the outer layer are smaller than in the inner layer, the angle of the strands in the outer layer may be made smaller than in the inner layer and still the outer layer will have less circumferential expansibility than the inner layer.

This construction provides a hose having substantially uniform volume when subjected to high fluid pressure, the expansibility being so small as to be negligible.

Having described the nature of my invention and the embodiments thereof, what I desire to secure by United States Letters Patent is as follows:

1. A flexible hose comprising a layer of braided material formed of strands disposed at an angle to the axis of the hose and a second layer of braided material superposed on the first layer, the strands of the second layer being disposed at a smaller angle to the axis of the hose.

2. A flexible hose comprising an inner layer of braided material formed of strands disposed at an angle of substantially 42° from the longitudinal axis of the hose and an outer layer of braided material, the strands of which form a lesser angle with the longitudinal axis of the hose.

3. A flexible hose comprising an outer layer of braided material formed of strands disposed at an angle of 40° 30' to the longitudinal axis of the hose and an inner layer of braided material formed of strands disposed at a greater angle to the longitudinal axis of the hose.

4. A flexible hose comprising an inner layer of braided material the strands of which form an angle of substantially 42° with the longitudinal axis of the hose, an outer layer of braided material the strands of which form an angle of substantially 40° 30' with the longitudinal axis of the hose, and a layer of resilient material interposed between the layers of braided material.

5. A flexible hose comprising an inner layer of braided material the strands of which form an angle of more than 40° with the axis of the hose and an outer layer of braided material the strands of which lie at an angle with respect to the strands of the inner layer and form an angle of less than 45° with the axis of the hose.

6. A flexible hose for fluids subject to pressure including a layer of braided material the strands of which form meshes having a longitudinal axis slightly shorter than determined by the forces due to the pressure of said fluids on the hose and a second layer of braided material the strands of which form meshes having a longitudinal axis slightly longer than determined by the forces on the hose.

7. A flexible hose including a plurality of layers of braided material the strands of which form meshes, the angles of the meshes in the different layers having different values of such nature as to render the hose substantially non-expansible.

MALCOLM LOUGHEAD.